United States Patent [19]

Ohmae et al.

[11] Patent Number: 4,584,528
[45] Date of Patent: Apr. 22, 1986

[54] SPEED DETECTING METHOD AND APPARATUS

[75] Inventors: Tsutomu Ohmae; Toshihiko Matsuda; Makoto Tachikawa, all of Hitachi, Japan

[73] Assignee: Hitachi, Ltd., Tokyo, Japan

[21] Appl. No.: 352,083

[22] Filed: Feb. 25, 1982

[30] Foreign Application Priority Data

Feb. 28, 1981 [JP] Japan ................................. 56-29271

[51] Int. Cl.[4] .......................... G01P 3/48; G01P 3/54; G04F 7/06
[52] U.S. Cl. ........................................ 324/166; 377/20
[58] Field of Search ....................... 324/166, 178, 161; 328/129; 377/20, 24

[56] References Cited

U.S. PATENT DOCUMENTS 3,524,131  8/1970  McWaid .
3,757,167  9/1973  Yoshikawa ..................... 324/166 X
4,128,892 12/1978  Vasa ................................ 377/20 X
4,227,150 10/1980  Widl ............................... 324/173 X
4,303,983 12/1981  Chaborski ........................ 377/20 X
4,355,279 10/1982  Younge ........................... 324/166 X

FOREIGN PATENT DOCUMENTS 2453247  5/1975  Fed. Rep. of Germany ...... 324/166
0160859 12/1980  Japan .
0610021  6/1978  U.S.S.R. ........................... 320/166

Primary Examiner—Stanley T. Krawczewicz
Assistant Examiner—Jose M. Solis
Attorney, Agent, or Firm—Antonelli, Terry & Wands

[57] ABSTRACT

A counter is provided to count an output pulse which a pulse generator generates each time a vehicle moves by a predetermined distance. A microprocessor is provided to actuate a timer in synchronism with the leading edges of the output pulse from the pulse generator. The timer is set to a constant time interval during which the speed of the vehicle is to be detected. The microprocessor calculates the speed of the vehicle from the count of the counter which count is a value during the time interval from when the timer starts to operate to when the pulse generator generates a pulse just before or after the end point of the set time interval. Thus, the speed of the vehicle can be detected with good resolution and precision.

10 Claims, 24 Drawing Figures

SPEED DETECTING METHOD AND APPARATUS

This invention relates to a speed detecting method and apparatus suitable for use in controlling the speed of a vehicle or a rotating body in a digital manner.

Generally, in order to detect the rotational speed of a motor as a digital signal, a pulse generator is used which generates a pulse signal whose frequency is proportional to the speed of rotation. The pulse generator generates a single pulse each time the motor rotates by 1/n of one revolution (n is a large integer). To detect the speed of rotation from the other output pulses of a pulse generator, there is used either a pulse number counting method or a pulse interval counting method.

The pulse number counting method operates to count the number of output pulses which the pulse generator generates during a constant period of time, thereby detecting the speed of rotation. The pulse interval counting method operates to count the pulses of a clock pulse signal of a constant frequency during the interval between two succeeding output pulses which the pulse generator generates, thereby detecting the speed of rotation.

However, both methods have the following drawbacks.

In the pulse number counting method, the number of pulses generated within a constant period of time at a low speed is small and thus the resolution of detecting speed is poor. In order to increase the resolution at a low speed, the constant period of time has to be extended or the number of pulses the pulse generator generates at each revolution has to be increased. Extension of the constant period of time, however, will increase the time which is required for the speed signal to be obtained, especially at high speeds and decrease the control response to the motor. On the other hand, it is also difficult to increase the number of pulses which the pulse generator generates at each revolution since this is determined by its construction.

Moreover, in the pulse interval counting method, the count of clock pulses becomes small at a high speed at which the interval between two succeeding output pulses from the pulse generator is narrow. Therefore, the resolution of speed detection is again poor.

The technique for obviating the aforementioned drawbacks is described in the literature, for example, U.S. Pat. No. 3,210,123 "High Speed Frequency Computing Apparatus". In this prior system, the frequency is measured from the number of periods of a sinusoidal signal which is counted during a set time interval. Specifically, counting of the number of periods of a sinusoidal wave signal is started at the measuring start point of the set time interval in synchronism with the sinusoidal wave signal, and ended at the end point of the set time interval. In such case, if a fraction of the sinusoidal wave signal occurs at the end of the set time interval, the count is compensated by the ratio of the preceding period to the time of the last period from the start thereof to the end point of the set time interval.

In the method described in U.S. Pat. No. 3,210,123 there is a problem that the precision of detection is reduced when the last period at the end of the set time interval and the period immediately therebefore are not equal to each other.

It is an object of this invention to provide a speed detecting method and apparatus which is capable of detecting the speed with good resolution and precision by counting the output pulse from a pulse generator.

A feature of this invention is that the speed is detected by counting the number of pulses which a pulse generator generates during a time interval from when the pulse generator generates a pulse at the measuring start point of a set time interval or just before or after the measuring start point, to when the pulse generator generates a pulse just before or after the end point of the set time interval.

Another feature of this invention is that the set time interval is changed in accordance with the speed of a vehicle.

Other objects and features of this invention will become apparent from the following description taken with the accompanying drawings in which.

Figure 1:
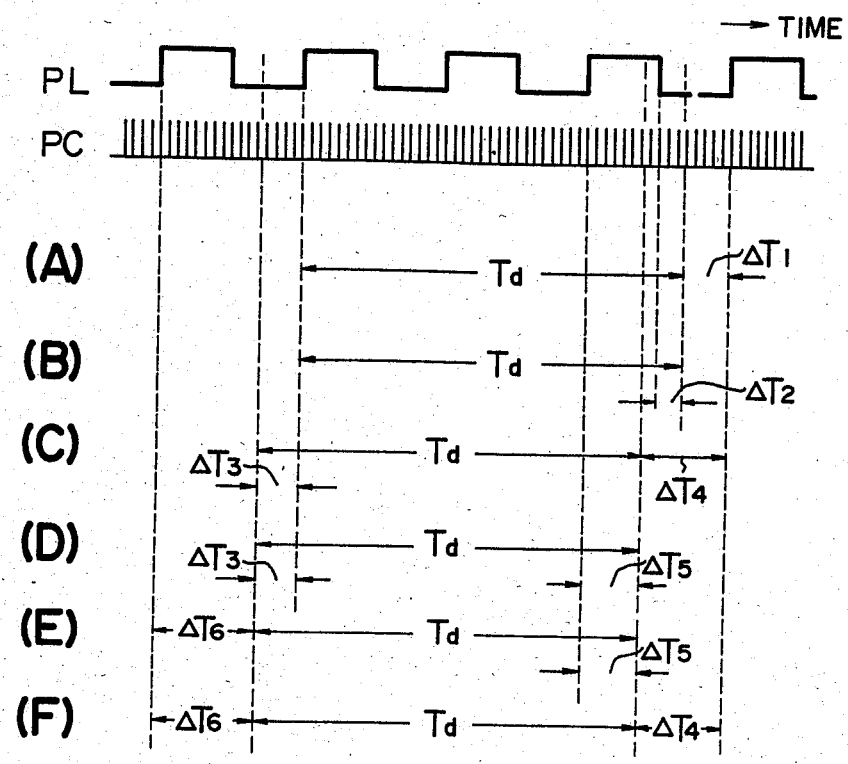
FIG. 1 is a timing chart useful for explaining the principle of this invention.

First, the fundamental idea of this invention will be described with reference to FIG. 1. FIG. 1 shows six methods A to F according to this invention. The method A thereof which is most easy to understand will be described.

In method A, the measurement of a set time interval Td and the counting of a pulse PL are started in synchronism with the leading edge of the output pulse PL from a pulse generator, and the counting of the pulse PL is stopped just after the end point of the set time interval Td in synchronism with the pulse PL which the pulse generator generates. The time during which the pulse PL is counted (speed detecting time) is $Td + \Delta T_1$. The count of the pulse PL within the time $Td + \Delta T_1$ is represented by $M_1$. A clock pulse CP is counted during the counting time $Td + \Delta T_1$, and the count, $M_2$ of the clock pulse CP is proportional to the counting time $Td + \Delta T_1$. In this invention, the speed detected value Nf is determined from the following equation by substituting the values $M_1$ and $M_2$ thereinto:

$$Nf = k(M_1/M_2) \tag{1}$$

k: constant

Thus, the speed detecting time is the sum of the set time interval (a constant value) Td and compensation time $\Delta T_1$. The maximum value of the compensation time $\Delta T_1$ is substantially equal to the interval of the pulse PL. The compensation time $\Delta T_1$ is the maximum at the lowest speed. However, if the count of the pulse PL during the set time interval Td at the lowest speed is represented by $M_{1L}$, then $\Delta T \approx Td/M_{1L}$, thus the $\Delta T$ being relatively small. Therefore, the speed can be detected with satisfactory control response upon the control of the vehicle.

On the other hand, as to the resolution, when the revolution rate is low, the count $M_1$ is small, but the rate of change of the compensation time $\Delta T_1$ is large, and thus the change of the count $M_2$ is great. Great change of the count $M_2$ means that the number of variation steps which $M_1/M_2$ can take is increased to increase the resolution.

As to the precision, the speed detecting time $Td + \Delta T_1$ is synchronized with the output pulse PL from the pulse generator, and the pulse PL duration is proportional to the distance by which the vehicle moves, the speed being detected from the accurate distance per $(Td + \Delta T_1)$, so that the precision of detection is high. In this case, the count of the pulse PL during the speed detecting time $Td + \Delta T_1$ takes an integral number greater than one, and so even if error occurs in the pulse interval of the pulses from the pulse generator, the detectoin error is at most $1/M_1$. Thus, the detection error can be reduced as compared with the conventional pulse interval counting method. Even if the speed is changed during the set time interval Td, the speed detecting time $Td + \Delta T$ is synchronized with the output pulse from the pulse generator, and thus the speed can be detected with high precision.

The fundamental idea of this invention has been described as above. The same thing is true for the method B in FIG. 1. The speed detecting time in method B is $Td - \Delta T_2$.

Although in the methods A and B the set time interval Td is measured in synchronism with the leading edge of the output pulse from the pulse generator, it can be measured in an asynchronous manner as shown in FIG. 1 by methods C to F. The speed detecting time according to methods C to F are as follows:

Method C—$Td - \Delta T_3 + \Delta T_4$
Method D—$Td - \Delta T_3 - \Delta T_5$
Method E—$Td + \Delta T_6 - \Delta T_5$
Method F—$Td + \Delta T_4 + \Delta T_6$ The basic idea of this invention has been described above. A specific embodiment of this invention will now be described below.

Figure 2:
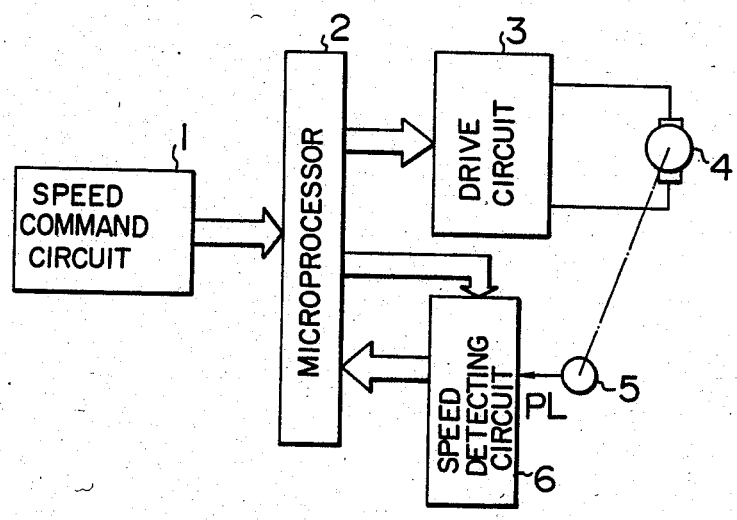
FIG. 2 shows an arrangement of one embodiment of this invention.

FIG. 2 shows an embodiment of this invention which is applied to a digital control apparatus for a motor. Referring to FIG. 2, there is shown a DC motor 4 which is driven by a drive circuit 3. This drive circuit 3 is formed of a power converter having power semiconductors such as thyristors, transistors and so on, and a control circuit for the power converter. A microprocessor 2 is supplied with a speed command value from a speed command circuit 1 and a detected speed value from a speed detecting circuit 6 so as to generate a control signal for controlling the operation of the drive circuit 3. The drive circuit 3 drives the DC motor 4 in accordance with the control signal from the microprocessor 2. A pulse generator 5 generates a pulse signal of a frequency proportional to the frequency of rotation, i.e., the speed, of the motor 4.

The operation of the arrangement as shown in FIG. 2 is well known and will not be described. The DC motor 4 is controlled to achieve a speed corresponding to the speed command value.

Figure 3:
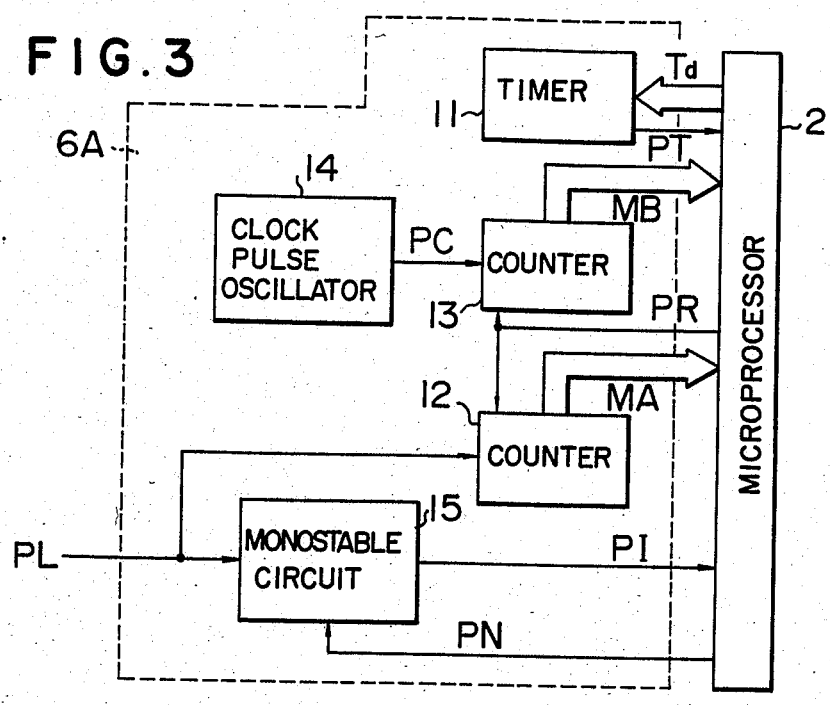
FIG. 3 shows an arrangement of one example of a speed detecting circuit according to this invention.
Figure 4:
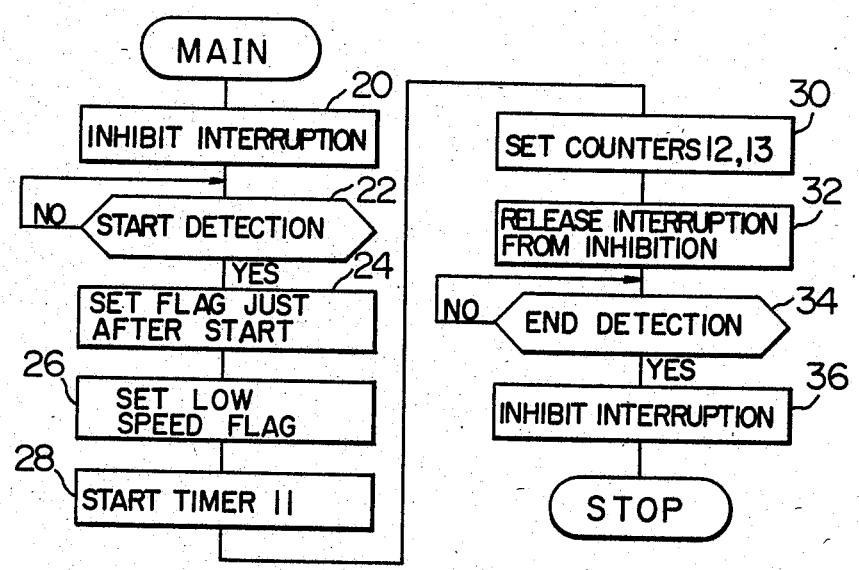
FIGS. 4 to 6 are flowcharts useful for explaining the operation of the arrangement of FIG. 3.

FIG. 3 shows a specific example of the speed detecting circuit 6 for the method A in FIG. 4, and the speed detecting circuit is represented by 6A. In FIG. 3, a timer 11 is actuated after being set to a time Td by the microprocessor 2. After the time Td, the timer 11 generates a time interruption pulse (hereinafter, referred to as TINT pulse) PT and supplies it to the microprocessor 2. A counter 12 counts the pulse PL in synchronizm with the leading edges of the pulse PL from the pulse generator 5. The contents, MA of the counter 12 are supplied to the microprocessor 2. A counter 13 counts a clock pulse PC from a clock pulse generator 14, and the contents MB of the counter 13 are supplied to the microprocessor 2. The counters 12 and 13 are reset to zero by a reset pulse PR from the microprocessor 2. A monostable circuit 15 supplies an interruption pulse (hereinafter abbreviated INT) PI to the microprocessor 2 in synchronism with the leading edges of the output pulse PL from the pulse generator 5. The interruption pulse PI is supplied to the microprocessor 2 only when an interruption inhibit pulse (hereinafter, abbriviated NIN pulse) PN is at "1" level, but inhibited from being generated when the NIN pulse PN is at "0" level.

The operation of FIG. 3 will be described with reference to the flowcharts of FIGS. 4 to 6, and the timing charts of FIGS. 7 to 10.

Figure 5:
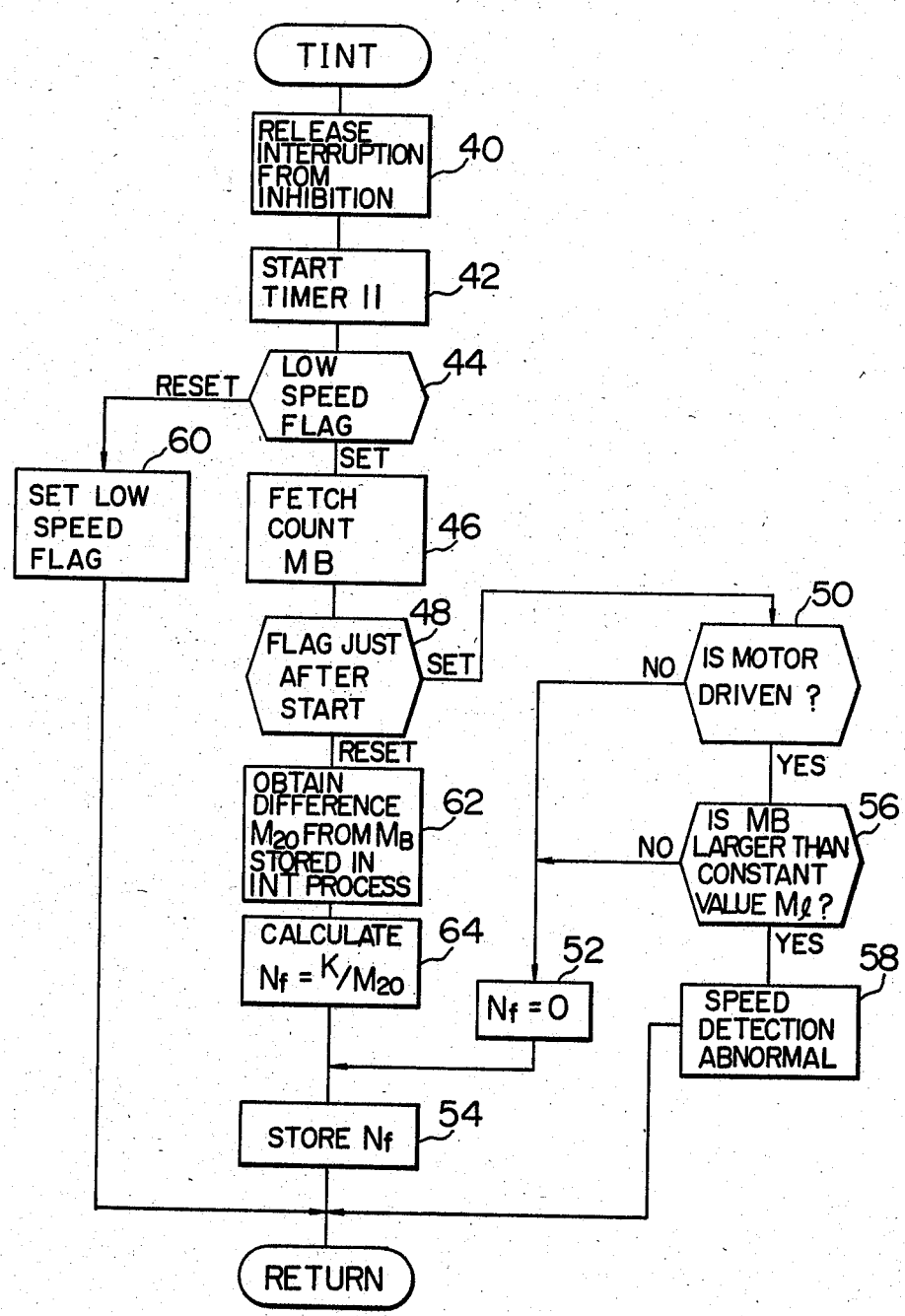
Figure 6:
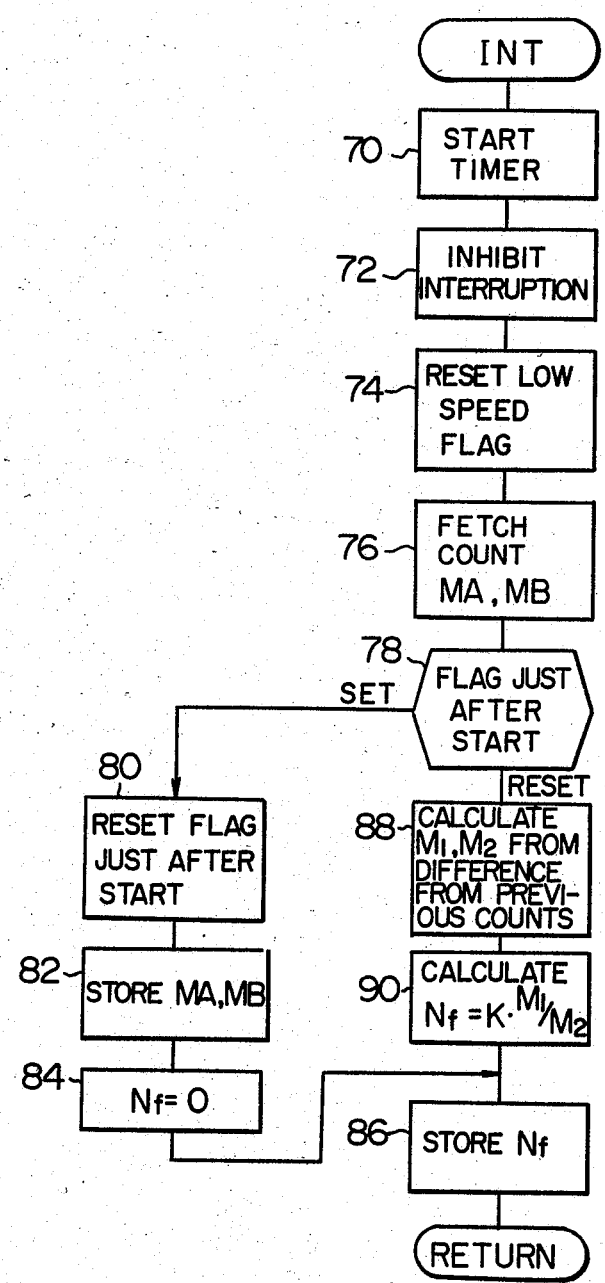

The microprocessor 2 executes three programs represented by the flow charts of FIGS. 4 to 6 as the processes for speed detection. First, the microprocessor 2 executes the normal process (MAIN process). At step 20 the NIN pulse PN is made to "0" level for inhibition of interruption, and under this condition, the start of speed detection is waited for. The speed detection start command, although not shown in FIG. 4, is supplied from a speed control arithmetic process. When the speed detection start command is applied, the program goes to steps 24 and 26 in turn, at which the flags just after the start and for low speed are set. After the flags are set, the program goes to step 28, where the timer 11 is set to time Td and actuated. At the same time, at step 30 the reset pulse PR is generated, and the counters 12 and 13 are reset thereby. Subsequently, at step 32 the NIN pulse PN is made "1" level, releasing the interruption from the inhibit state. This state at step 32 is kept until the detection end command at step 34 is supplied from the speed control arithmetic process. Under this state, the speed detection process is performed as will be described later. When the detection end command is applied, the program goes to step 36, where the NIN pulse PN is made "0" level, and the INT pulse P1 is inhibited from occuring for interruption.

Figure 7:
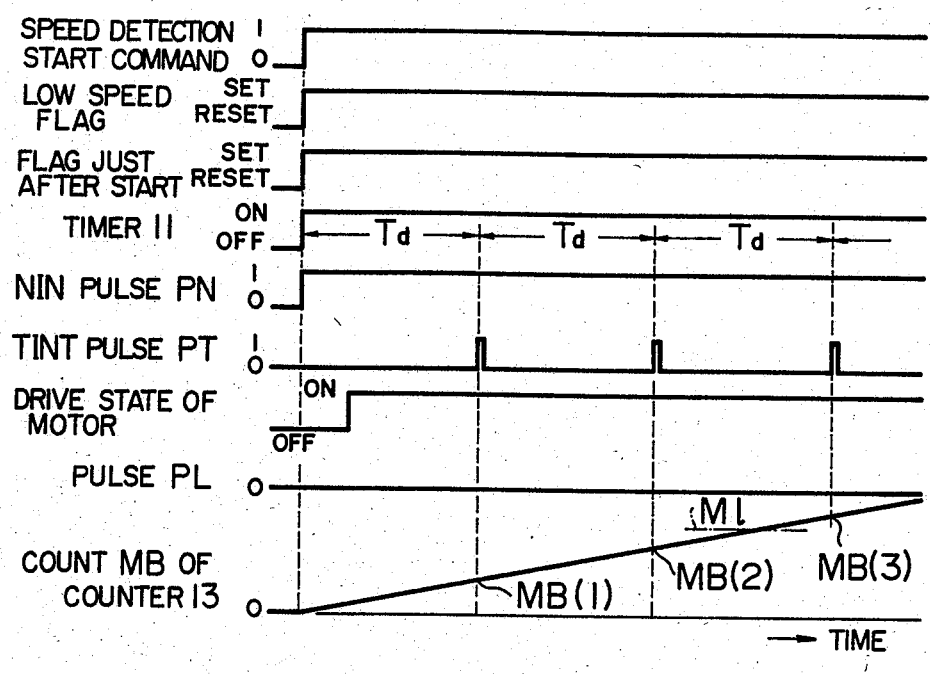
FIGS. 7 to 10 are timing charts useful for explaining the operation of FIG. 3.
Figure 8:
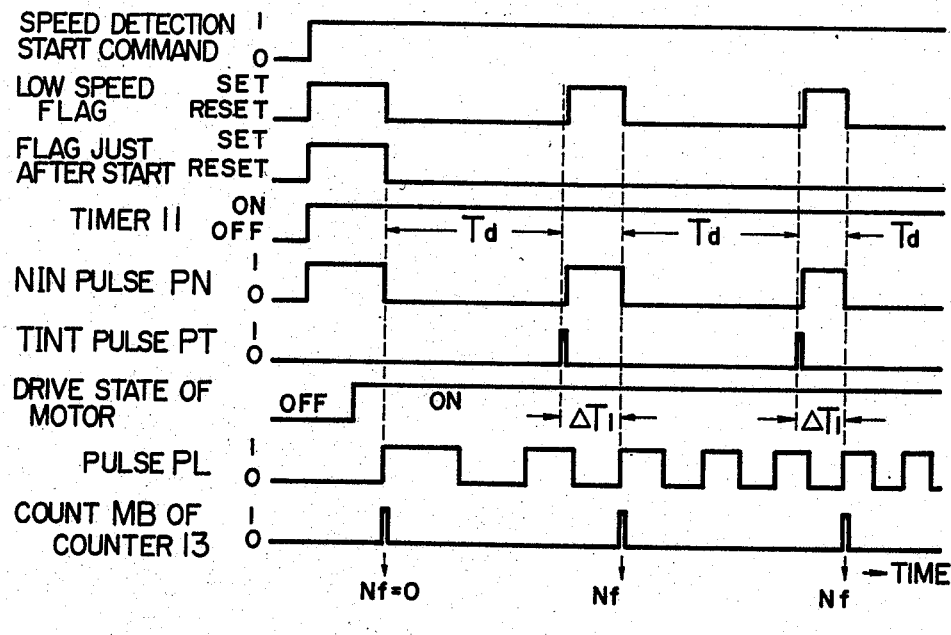

Thus, in the MAIN process of FIG. 4, at step 28, the timer 11 is actuated, and at step 34 the state is kept. Under this condition, when the set time Td comes, the timer 11 generates the TINT pulse PT. In this case, the time interruption process (TINT process) of FIG. 5 is executed. In the time interruption process, first at step 40 the interruption is released from inhibition, and at step 42 the timer 11 is set to time Td and actuated. Then, at step 44 the low speed flag is set as shown in FIG. 7, and at step 46 the contents MB (1) is supplied from the counter 13 to the microprocessor 2. In FIG. 7, the number within the parentheses following the count MB indicates the number of times the detection is made, and MB (n) represents a detected value at n-th detection. After the count MB (1) is supplied from the counter 13 to the microprocessor 2, the state of the flag just after the start is decided at step 48, and since as shown in FIG. 7 the flag is set, the program goes to step 50. At step 50, it is decided whether the motor 4 is driven or not. The state of this drive is specified by the speed control arithmetic process although not described. If the motor is not being driven, the program goes to step 52, where the speed detected value Nf is made 0. At step 54, the value is stored in a predetermined memory, ending the first process. If the motor is being driven as shown in FIG. 7, the program goes to step 56 where it is decided whether the contents MB (1) of the counter 13 exceeds a constant value $M_1$ or not. If it does not exceed that constant value, processes at steps 52 and 54 are executed.

However, if the pulse generator 5 generates no output pulse PL even while the motor is being driven as shown in FIG. 7, the process of FIG. 5 is executed at each time Td. As a result, the counter 13 is not reset, and thus the count MB becomes, for example, MB (3), exceeding the constant value $M_1$. As a consequence, the program goes to step 58, where the pulse generator 5 is determined to be abnormal.

Thus, if the pulse generator 5 generates no pulse for a predetermined time (the time taken for the count MB of the clock pulse PC to exceed the constant value $M_1$) from the initiation of speed detection even while the motor 4 is being driven, the pulse generator 5 is determined to be abnormal. Consequently, a dangerous speed control such as reckless driving of the motor is prevented.

When the pulse generator 5 is normal, the speed detection is made as follows. The operation will be described with reference to FIG. 8.

When the motor 4 is driven, the pulse generator 5 generate the output pulse PL. At this time, the microprocessor 2 is in the state at step 32 of FIG. 4, where the interruption is released from inhibit by the NIN pulse PN being made "1" level. Thus, the monostable circuit 15 generates the INT pulse PI in synchronism with the leading edges of the pulse PL. The microprocessor 2 executes the interruption process (INT process) of FIG. 6 when supplied with the INT pulse PI.

First, at step 70 the timer 11 is set to constant time Td and at step 72 the interruption within time Td is inhibited. At step 74, the low speed flag is reset, and at step 76 the contents MA and MB of the counters 12 and 13 are supplied to the microprocessor 2. Since the flag just after the start is set in the process using the first INT pulse PI from the start of detection, the program goes to step 80. If the flag just after the start is set, the contents MA and MB of the counters are stored at step 82. When the first INT pulse PI from the start of detection is supplied, the speed detected value Nf is made 0 at step 84, and stored in a memory at step 86. Thus, in the interruption processing by the first INT pulse PI from the start of detection, the contents MA and MB of the counters 12 and 13 are stored.

When the time Td has elapsed after the application of the first INT pulse PI, the timer 11 generates the TINT pulse PT. The microprocessor 2 executes the time interruption process as shown in FIG. 5 when supplied with the TINT pulse PT.

First, at step 40, the NIN pulse PN is made "1" level releasing the interruption from inhibition, and at step 42 the timer 11 is set to the time Td and actuated. Then, at step 44 the low speed flag is reset in the interruption process by the INT pulse PI, thus the program being progressed to step 60. At step 60, the low speed flag is again set, ending the process.

Figure 9:
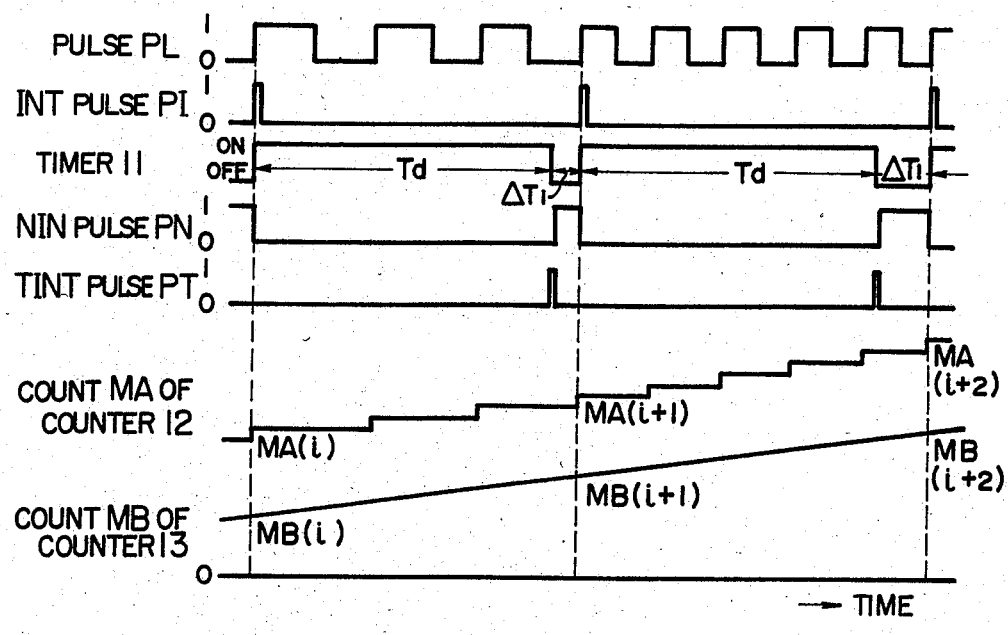

When the microprocessor 2 is supplied with the INT pulse PI, the program goes from step 78 to steps 88 and 90 since the flag just after the start is already reset. At step 90, the detected value Nf is calculated. This calculation process will be described with reference to the timing chart of FIG. 9. FIG. 9 shows the speed calculation process from the time i at which the INT pulse PI is generated.

When assuming that the contents of the counters 12 and 13 at the generation of the INT pulse PI, or time i are MA (i) and MB (i), respectively, the counts $M_1$ and $M_2$ of the pulse PL are calculated at step 88 from the counts MA (i+1) and MB (i+1) at time (i+1) as $$M_1 = MA(i+1) - MA(i) \qquad (2)$$

$$M_2 = MB(i+1) - MB(i) \qquad (3)$$

At step 90, the speed detected value Nf is determined by substitution of the calculated values $M_1$ and $M_2$ from Eqs. (2) and (3) into Eq. (1). The value Nf calculated at step 90 is stored in a predetermined memory at step 86.

At the generation of the INT pulse PI at time i+2, the counts $M_1$ and $M_2$ are determined by the equations $$M_1 = MA(i+2) - MA(i-1) \qquad (4)$$

$$M_2 = MB(i+2) - MB(i-1) \qquad (5)$$

and the speed detected value is calculated as described above.

Thus, when the motor 4 is being driven, the process steps 70 to 78, 88, 90, 86 in the interruption process of FIG. 6 and the steps 40, 42, 44, 60 in the time interruption process are repeatedly executed, the speed detected value Nf at each generation of the INT pulse PI can be determined. The speed detected value Nf in the memory at step 86 is updated at each detection of speed, and used for the speed control to the motor 4.

When the motor 4 is being driven at a very low speed, the INT pulse PI occurs at long intervals of time. In this case, the following processes are executed, which will be described with reference to the timing chart of FIG. 10.

Figure 10:
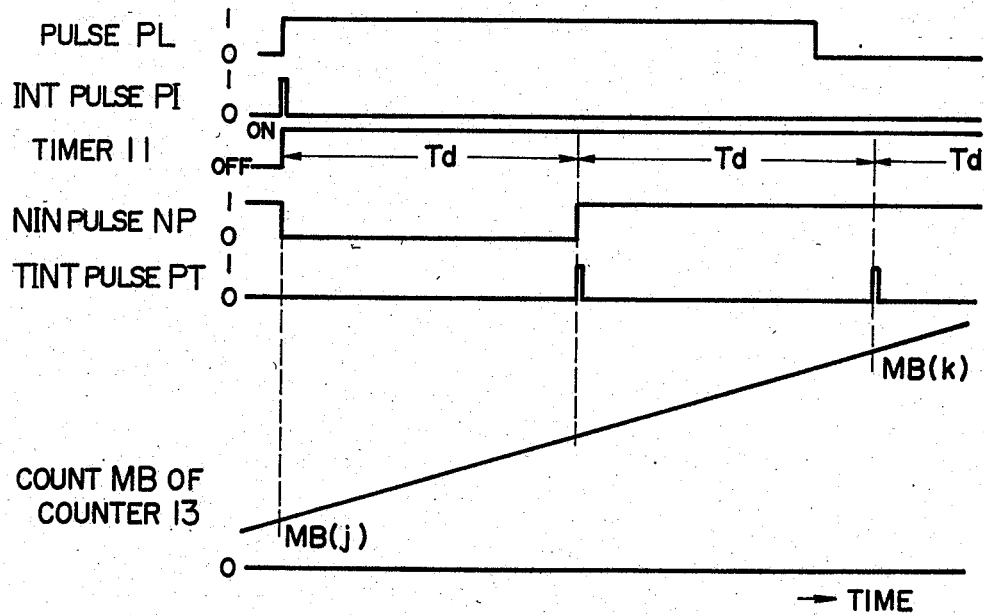

It is assumed that the motor 4 rotates at a low speed and the pulse generator 5 generates the output pulse PL as shown in FIG. 10. At the leading edge of the pulse PL, the monostable circuit 15 supplies the INT pulse PI to the microprocessor 2. The microprocessor 2 executes the interruption processing of FIG. 6 and at step 74 the slow speed flag is reset. Under this state, the timer 11 is set, and after time Td has elapsed, the timer 11 supplies the TINT pulse PT to the microprocessor 2. The microprocessor 2 executes the time interruption process as shown in FIG. 5 when supplied with the TINT pulse PT.

First, to release the interruption from the inhibition at step 40, the NIN pulse PN is made "1" level, and at step 42, the timer 11 is set to the time Td and actuated. Then, at step 44, the state of the low speed flag is decided. In this case, since the low speed flag for the interruption process (step 74 in FIG. 6) by the INT pulse PI is reset, the program goes to step 60, where the low speed flag is set. Under this condition, if the INT pulse PI occurs, the speed detection is made as shown in FIG. 9, but if the INT pulse PI does not occur even after the time Td has elapsed from the generation of the TINT pulse PT, the timer 11 again generates the TINT pulse PT and the TINT process is executed. In this case, since the low speed flag is set by the previous TINT process, the processes at steps 44, 46, 48, 62, 64 are executed. At step 46, the k-th count MB (k) of the counter 13 is supplied to the microprocessor 2. If the count of the counter 13 is MB (j) when the j-th INT pulse PI occurs, the difference, $M_{20} = MB(k) - MB(j)$ is determined at step 62. At step 64, the speed detected value, $N_f = K/M_{20}$ is calculated, and at step 54 the value is stored in a memory, the TINT process being ended.

The above operations are continuously performed until the pulse generator 5 generates the pulse PL. Therefore, calculated values K/Td, K/2Td, K/3Td... are obtained in turn at each time Td. Then, when the INT pulse PI occurs, the speed detected value $N_f$ is calculated by the interruption process of FIG. 6. In this case, the speed detection is made as in the conventional pulse interval counting method.

The embodiment of method A in FIG. 1 has been described. It will be understood that the speed can be detected with good resolution and precision even if the speed is suddenly changed. Moreover, even if the speed is reduced to a very low value, substantially the actual speed can be detected at each time interval. Furthermore, since division is made by the software of the microprocessor, the circuit arrangement can be simplified.

The speed detection by method B in FIG. 1 will be described with reference to FIG. 11, in which like parts as those of FIG. 3 are identified by the same reference numerals. In a speed detecting circuit 6B in FIG. 11, the counter 13 is supplied as a reset pulse with a logical sum of a reset pulse $PR_1$ from the microprocessor 2 and a pulse $PR_2$ which a monostable circuit 102 generates in synchronism with the leading edges of the output pulse PL from the pulse generator 5 through an OR circuit 104. A timer 100 is actuated by the output pulse (INT pulse) PI from the monostable circuit 15, and after lapse of a constant time Td, it generates the TINT pulse PT.

Figure 12:
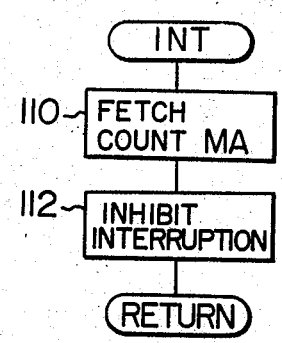
FIGS. 12 and 13 are flowcharts useful for explaining the operation of the arrangement of FIG. 11.
Figure 13:
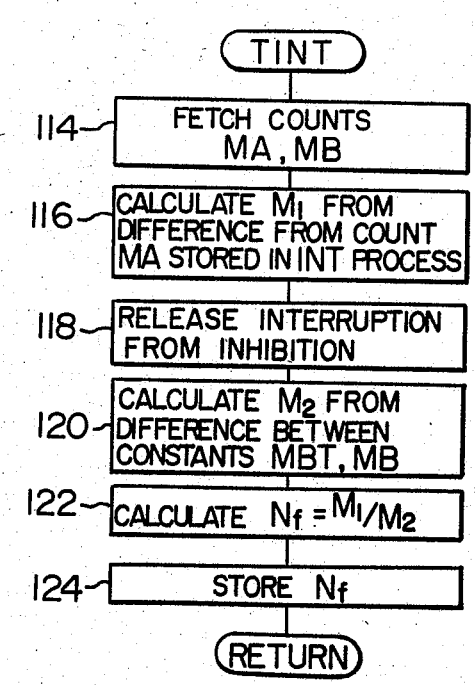
Figure 14:
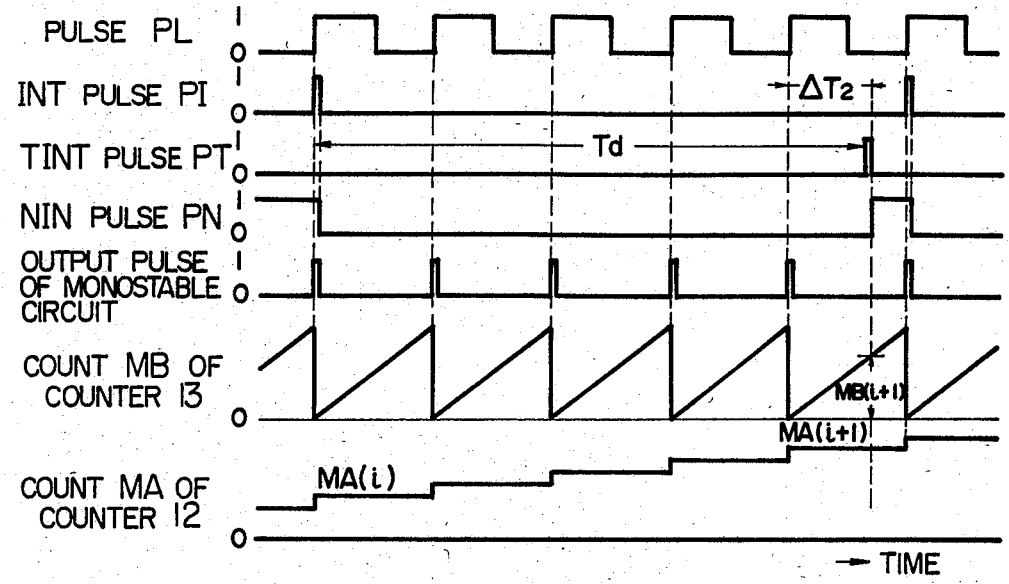
FIG. 14 is a timing chart useful for explaining the operation of the arrangement of FIG. 11.

The operations of the arrangement of FIG. 11 will be described with reference to the flowcharts of FIGS. 12 and 13 and the timing chart of FIG. 14. The flowcharts of FIGS. 12 and 13 show the process for only detecting the speed stationarily, and the start and low speed process described in the embodiment of FIG. 3 are omitted.

The microprocessor 2 executes the two processes of the interruption process by the INT pulse PI from the monostable circuit 15 and the time interruption process by the TINT pulse PT from the timer 100. When the monostable circuit 15 generates the INT pulse PI, the microprocessor 2 executes the interruption process of FIG. 13. First, at step 110, the contents MA (i) of the counter 12 is supplied to the microprocessor 2. Since the leading edges of the pulse PL at which the counter 12 counts up occur before the monostable circuit 15 generates the INT pulse PI, the count MA (i) supplied in the INT process includes the pulse PL at the time of generation of the INT pulse PI. At step 112, the NIN pulse PN is made "0" level, inhibiting the INT pulse PI from generation.

On the other hand, the INT pulse PI is supplied to the timer 100 as a trigger signal thereto. The timer 100 generates the TINT pulse PT the time Td after the INT pulse PI is supplied to the timer 100. The microprocessor 2 executes the TINT process of FIG. 15 when supplied with the TINT pulse.

First, at step 114, the microprocessor 2 receives the counts MA (i+1) and MB (i+1) from the counters 12 and 13 at time (i+1) at which the TINT pulse occurs. At step 116, the count MA (i) received at time i in the INT process, the above counts MA (i+1) and MB (i+1) are used for the calculation of the variation $M_1$ of the pulse PL from $$M_1 = MA(i+1) - MA(i) \quad (6)$$

At step 118, the NIN pulse PN is made "1" level to release the interruption in the INT process from inhibition, and at step 120, the value, $M_2$ is calculated from $$M_2 = MB_T - MB(i+1) \quad (7)$$

where $MB_T$ represents the count of the output clock pulse PC from the clock pulse oscillator 14 for time Td, and is a constant value proportional to the time Td. The MB (i+1) is a value proportional to the time $\Delta T_2$ between the end point (i+1) of the time Td and the leading edge of the previous PL just therebefore. Thus, the value $M_2$ determined by Eq. (7) is a value proportional to the difference, $Td - \Delta T_2$.

At step 122, Eq. (1) is calculated by substituting the values $M_1$ and $M_2$ obtained from Eqs. (6) and (7), and at step 124 the speed detected value $N_f$ is stored in a memory to end the TINT process. The INT process and the TINT process as described above are repeatedly performed to detect the speed.

Figure 11:
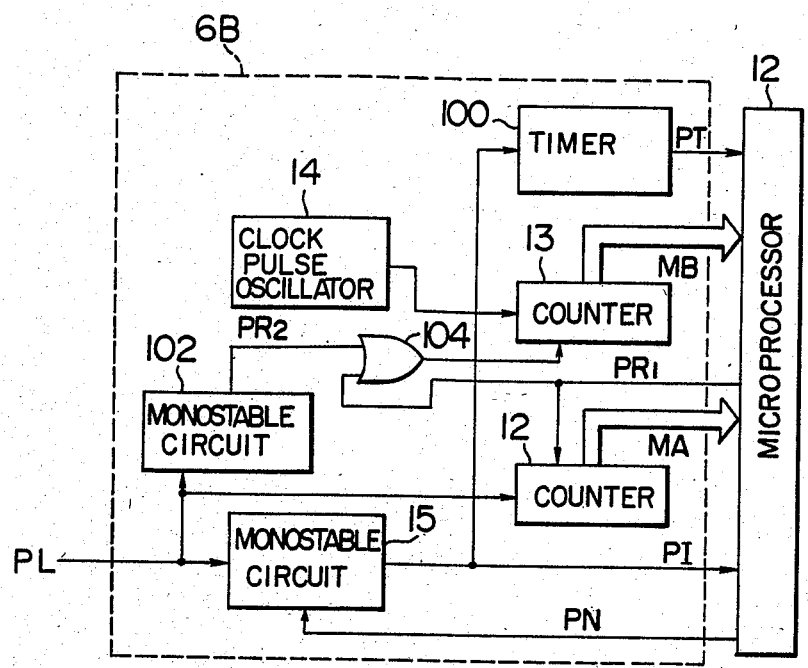
FIG. 11 is an arrangement of another example of a speed detecting circuit according to this invention.

Also in the embodiment of FIG. 11, the speed detected value is obtained with high resolution. Moreover, since the speed detecting time is constant, or Td, the algorithm of the speed control computation having a relation with time, for example, the process using integrating compensation can be performed simply.

Figure 15:
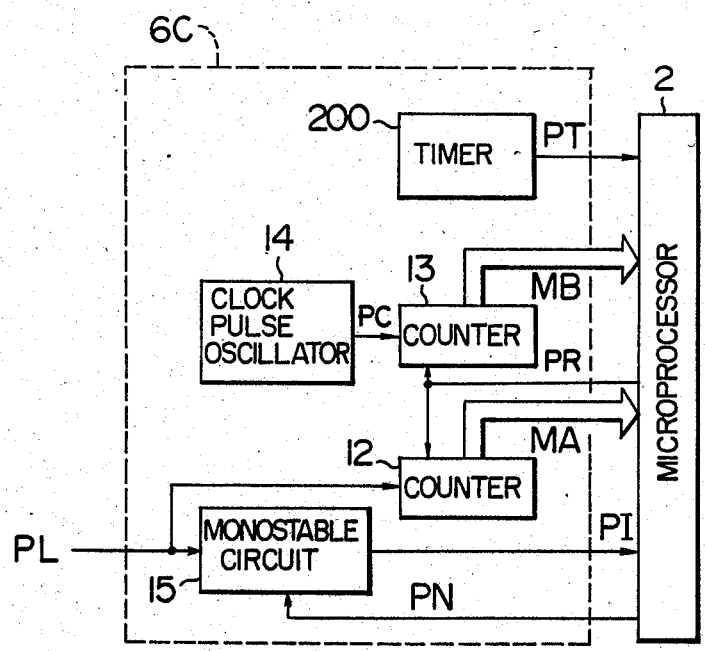
FIG. 15 is an arrangement of still another example of a speed detecting circuit according to this invention.

FIG. 15 shows another example of the speed detecting circuit of this invention. In this arrangement, the start point of the set time Td is not in synchronism with the output pulse PL from the pulse generator 5 for detection of the speed. In order to detect the speed with the start point of the set time Td being not in synchronism with the pulse PL, there are employed methods C to F in FIG. 1. The method D will be described below.

The arrangement of FIG. 15 is different from that of FIG. 3 in that a timer 200 in a speed detecting circuit 6C generates the TINT pulse PT at each time Td. The time interruption process by the TINT pulse PT from the timer 200 has a priority lower than that of the interruption process by INT pulse PI. Therefore, the microprocessor 2 interrupts the execution of the time interruption process and executes the interruption prior thereto when supplied with the INT pulse PI.

The operations of the arrangement of FIG. 15 will be described with reference to the flowcharts of FIGS. 16 and 17 and the timing chart of FIG. 18.

In FIG. 15, the microprocessor 2 performs the calculation of the speed detected values in the time interruption process and it is supplied with data necessary for the time interruption process and executes the preliminary computation in the interruption process.

Figure 16:
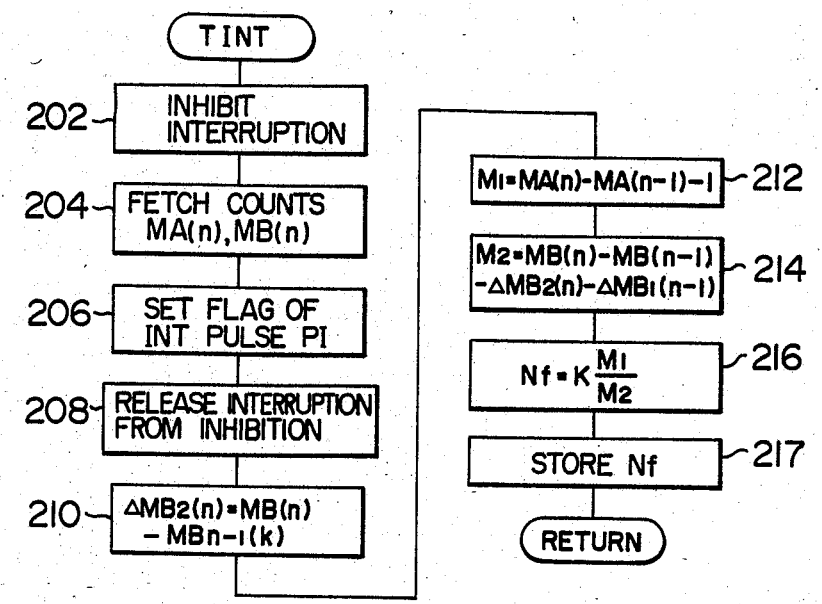
FIGS. 16 and 17 are flowcharts useful for explaining the operation of the arrangement of FIG. 15.

When the timer 200 generates the TINT pulse PT at an n-time point, the microprocessor 2 executes the TINT process as shown in FIG. 16. First, at step 202, the NIN pulse PN is made "0" level, inhibiting the INT pulse PI from interrupting, and at step 204, the counts MA (n) and MB (n) of the counters 12 and 13 are supplied to the microprocessor 2. At step 206, the flag is set which decides that the first INT pulse PI has been generated after the INT pulse PT has occured. At step 208, the NIN pulse is made "1" level, releasing the interruption from the inhibition state. At steps after step 208, the TINT process is executed, but when the INT pulse PI occurs, the INI process of FIG. 17 is executed. For convenience of explanation, it is assumed that the process 210 and the following operations are performed continuously in turn. At step 210, the count, MB n−1(k) at time n−1(k) at which the INT pulse PI occurs just before n-time point is subtracted from the count MB (n) of the counter 13. The generation time point n−1(k) is a time point at which the k-th pulse PL occurs after the TINT pulse PT was generated at n−1 time point. The value, $\Delta MB_2$ (n) determined at step 210 is the time interval between the TINT pulse PT occuring at n-time point and the leading edge of the pulse PL generated just therebefore, and is proportional to time $\Delta T_5$ in FIG. 1. At step 212, the value $M_1$ is determined by subtracting 1 of pulse PL from the difference between the count MA (n) of the counter 12 at n-time point and the count MA (n−1) at time-point N−1. The subtraction of 1 pulse PL is necessary because the count MA (n−1) at (n−1) at (n−1)-time point includes a value of 1 which is counted out of the set time Td. At step 214, the value $M_2$ is determined by substituting the counts MB (n) and MB (n−1) of the counter 13, the value $\Delta MB_2$ (n) at step 210, and $\Delta MB_1$ (n−1) determined by the INT process which will be described later, into the equation (8), $$M_2 = MB(n) - MB(n-1) - \Delta MB_2(n) - \Delta MB_1(n-1) \quad (8)$$

The value $M_2$ obtained from Eq. (8) is a value proportional to the time Tdo as shown in FIG. 18. At steps 216, the speed $N_f$ is calculated by using the values $M_1$ and $M_2$, and at step 217 the speed detected value $N_f$ is stored.

Figure 17:
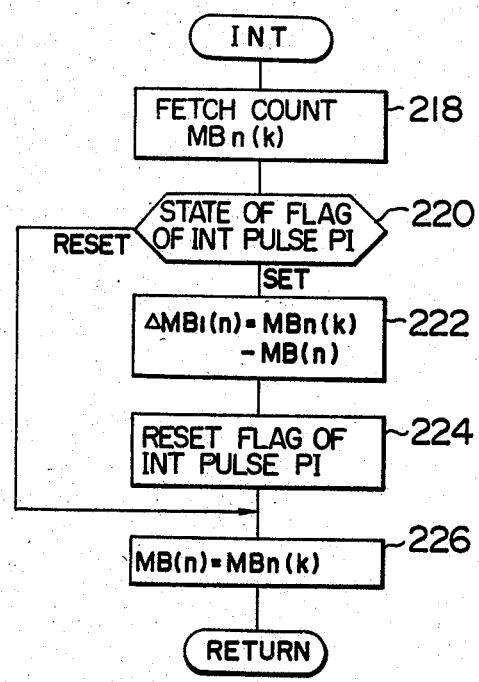
Figure 18:
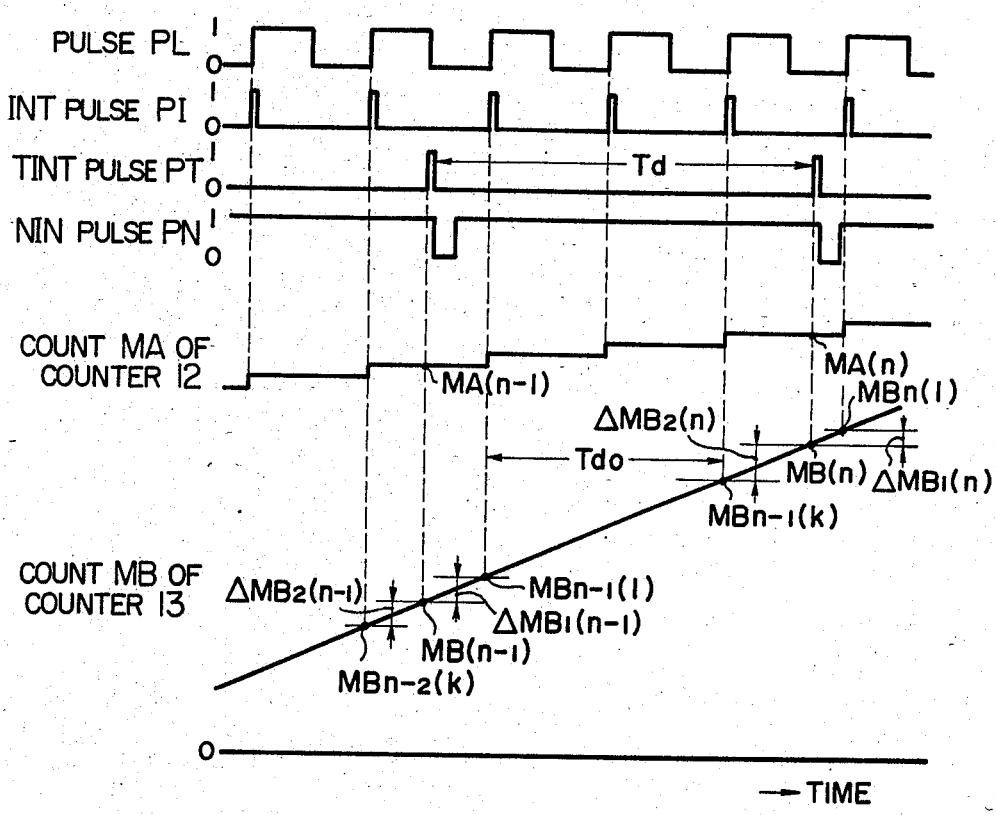
FIG. 18 is a timing chart useful for explaining the operation of the arrangement of FIG. 15.

On the other hand, when supplied with the INT pulse PI, the microprocessor 2 executes the INT process of FIG. 17. First, at step 218, the count MB of the counter 13 is supplied to the microprocessor 2, and at step 220, a decision is made of the state of the flag of the INT pulse PI. The flag of the INT pulse is set by the TINT process of FIG. 16 if the INT pulse PI is the first one after the TINT pulse PT was generated. If the INT pulse is the first one after the TINT pulse PT was generated at n-time point, the flag is set, and at step 222 the value $\Delta MB_1$ (n) is determined from the equation (9), $$\Delta MB_1(n) = MB \; n(1) - MB(n) \quad (9)$$

The $\Delta MB_1$ (n) in Eq. (9) is a value proportional to the time $\Delta T_3$ in method D in FIG. 1. This value $\Delta MB_1$ (n) is stored for use in the calculation of speed by the TINT pulse at time n+1. For the calculation of speed at the n-time point there is used the difference value MB $_1$(n−1) between the counts of the counter 13 at the TINT pulse of time n−1 and the first INT pulse PI just thereafter.

When the process at step 222 is completed, the flag for the INT pulse is reset at step 224, and then the count MB=MB of the counter 13 is stored at step 226. In this case, MB (n) becomes MB (1). Thereafter, the INT processes up to occurence of the TINT pulse PT is performed at steps 220 to 226 in turn, and at the generation of the INT pulse, the count of the counter 13 is stored.

Thus, even if the start point of the set time Td is not synchronized with the output pulse PL from the pulse generator 5, the speed can be detected. Thus, there is no need to synchronize the start point of the set period Td with the pulse PL and the speed detection can be performed with a simple arrangement.

While the method D in FIG. 1 has been described with reference to FIG. 15, it will be evident that the method C can be implemented easily. The method C will not be described for the sake of convenience.

Moreover, the methods E and F in FIG. 1 can be executed likewise by determining the values $M_1$ and $M_2$ in the embodiment of FIG. 15 from the following expression; for method E $$M_1 = MA(n) - MA(n-1) \quad (10)$$

$$M_2 = MB(n) - MB(n-1) - \Delta MB_2(n) + \Delta MB_2(n-1) \quad (11)$$

for method F $$M_1 = MA(n) - MA(n-1) \quad (12)$$

$$M_2 = MB(n) - MB(n-1) + \Delta MB_1(n) + \Delta MB_2(n-1) \quad (13)$$

Further explanation thereof will be omitted.

In the above embodiment, the speed detecting time is substantially constant as time Td, and in the steady state in which the motor speed does not almost change, it is necessary to prolong the speed detecting time to improve the precision of speed detection.

Figure 19:
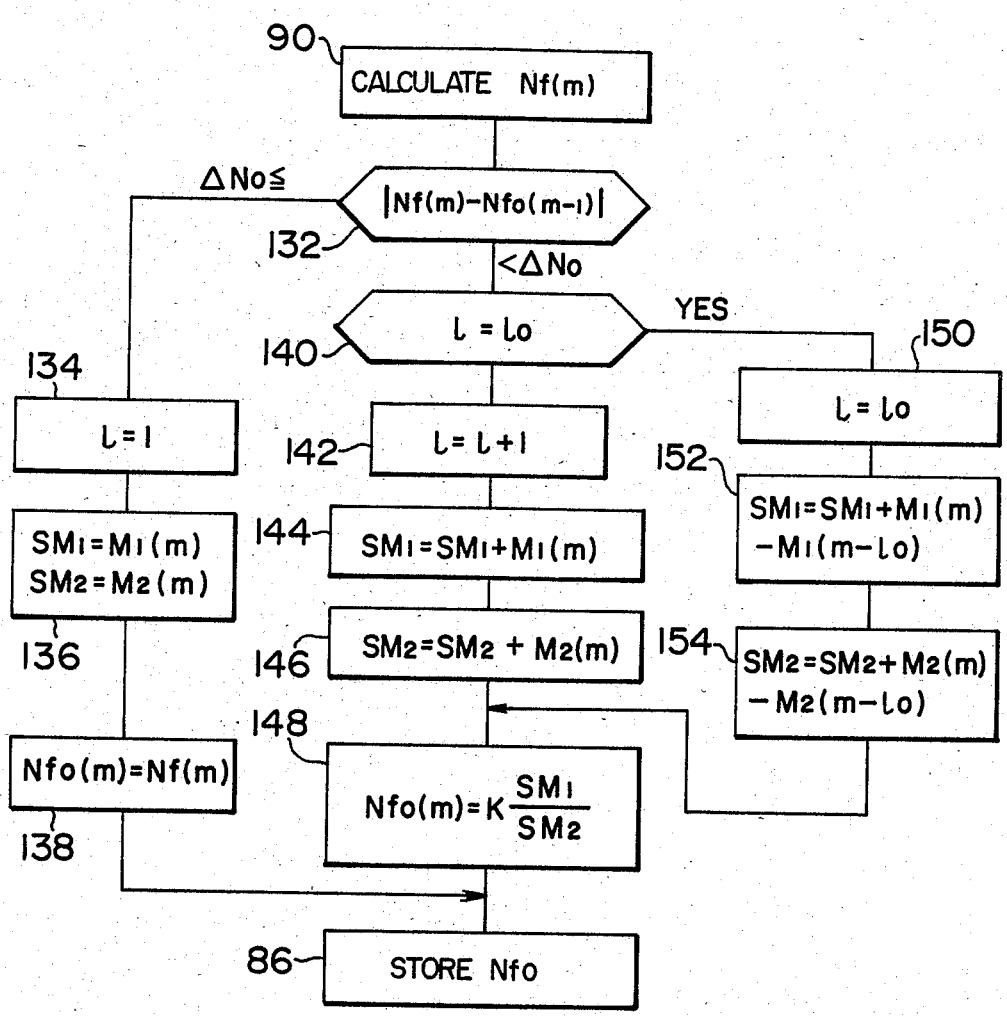
FIGS. 19 and 20 are a flowchart and a timing chart useful for explaining another detecting method according to this invention.

The extension of the speed detecting time can be performed for example by the INT process in the embodiment of FIG. 3 and the addition of the process of FIG. 19. Specifically, the process of FIG. 19 is added between the steps 90 and 86 in FIG. 6.

Figure 20:
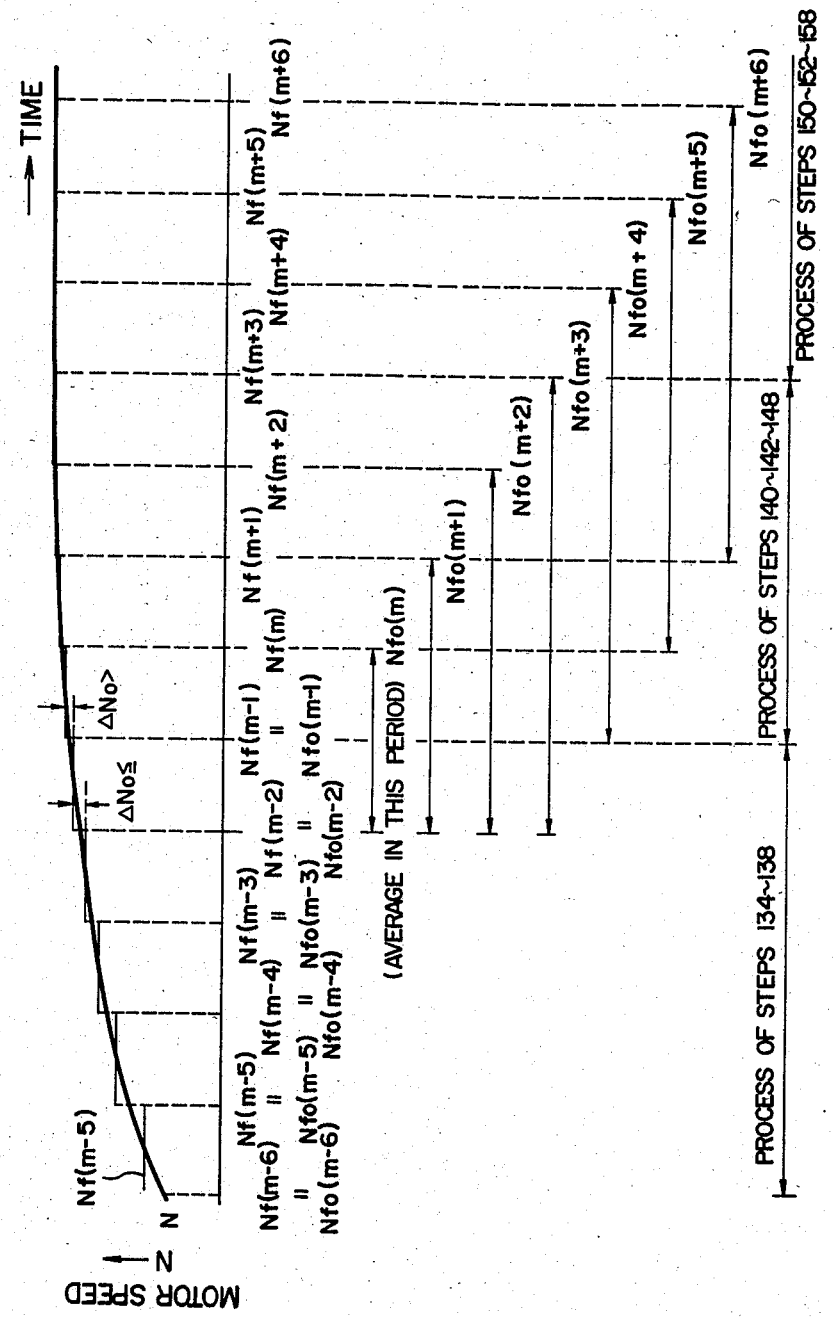

The operations of this case will be described with reference to the timing chart of FIG. 20. At step 90, the speed detected value $N_f$ (m) is computed, where m represents a number of order. At step 132, the previous detected value $N_{fo}$ (m−1) is subtracted from the m-th value. The final speed detected value is represented by $N_{fo}$, and $N_f$ represents the result obtained by the computation at step 90. If $|N_f(m) - N_{fo}(m-1)|$ exceeds a preselected speed change setting value $\Delta N_o$, the step 134 and the following steps are performed. The value $\Delta N_o$ is selected to be desirably about the maximum value of the variation of the speed detected value $N_f$ measured at each $Td + \Delta T_1$ when the motor is rotated at a constant speed.

When the difference between the previous value and this value exceeds $\Delta N_o$, steps 134 to 138 are executed and the speed detected value $N_f$ obtained at step 90 is stored as $N_{fo}$. The l=1, and $SM_1$, $SM_2$ at steps 134 and 136 are set for the process which will be described later. When the motor speed N is changed as shown in FIG. 17, detected values up to the value $N_f(m-1)$ are processed at steps 134 to 138.

If the value of $|N_f(m)-N_{fo}(m-1)|$ is reduced to less than $\Delta N_o$ at the detection of $N_f(m)$ in FIG. 17, steps 140 and the following steps are performed. If, now, $l_o$ of 5 is established, at step 134, 1 becomes 1, and thus the program goes to step 142. At step 142, l is made 2 and $SM_1$ and $SM_2$ are calculated at steps 144 and 146. Since the values $SM_1$ and $SM_2$ include $M_1(m-1)$ and $M_2(m-1)$ at time $m-1$ at step 136, the new values $SM_1$ and $SM_2$ are the sum of the second counts and those values. In other words, the detecting time is extended to about 2Td. At step 148, the speed detected value $N_{fo}$ is calculated. Similarly, for l=2, 3, 4, the detecting time is extended to 3Td, 4Td, 5Td, respectively, thus detection precision is improved. For l=5, the program goes to step 150, and steps 152 and 154 are executed. This is because the detecting time is limited to $l_o$Td (here, 5Td). Therefore, the counts $M_1(m-l_o)$, $M_2(m-l_o)$, $l_o$ times before are subtracted from the counts $M_1(m)$, $M_2(m)$ at this time and values $M_1(m)$, $M_2(m)$ are added thereto, respectively. The speed detected values $N_{fo}(m+4)$ and so on at time m+4 and the following values are obtained at steps 150 to 154.

As described above, in the steady state in which the speed is not almost changed, the speed detecting time is extended thereby improving the precision of detection. In this case, when the speed is suddenly changed, the program goes to steps 134 to 138, and therefore the responsiveness for the speed detection is never lost.

Although in the description with reference to FIG. 19, the speed detecting time is extended when the change of the speed detected value is below a preset value, the detection precision can be improved even if the speed detecting time is extended when the speed detected value is small or when the speed control division is small. In that case, the process at step 132 is designed to be for each algorithm.

The improvement of the detection precision by the extension of the speed detecting time can similarly be achieved by the methods B to F as well as method A.

Figure 21:
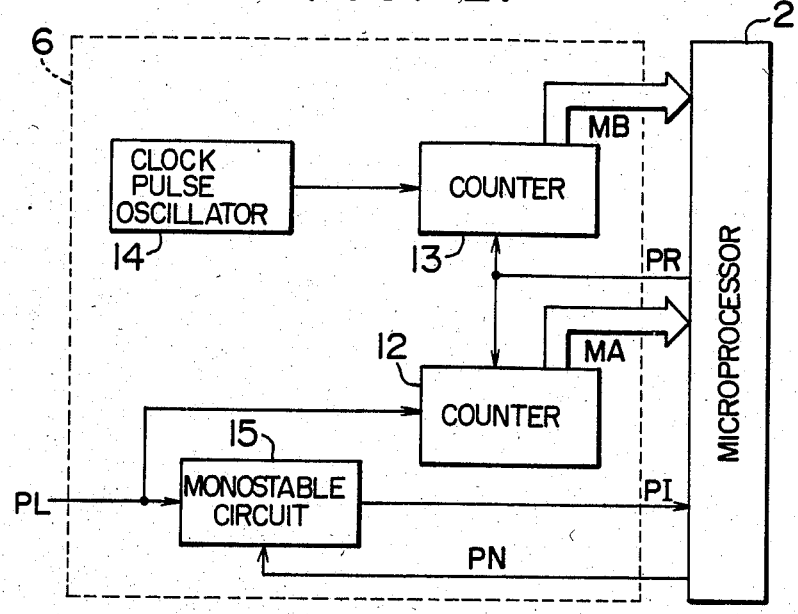
FIG. 21 is an arrangement of further example of a speed detecting circuit according to this invention.

FIG. 21 shows another example of the speed detecting circuit of this invention, in which the speed is detected each time a pulse generator produces an output pulse.

The arrangement of FIG. 21 is different from that of FIG. 3 in that a speed detecting circuit 6 D has no timer 11.

The operations of the arrangement of FIG. 21 will be described with reference to the flowcharts of FIGS. 22 and 23 and the timing chart of FIG. 24.

Figure 22:
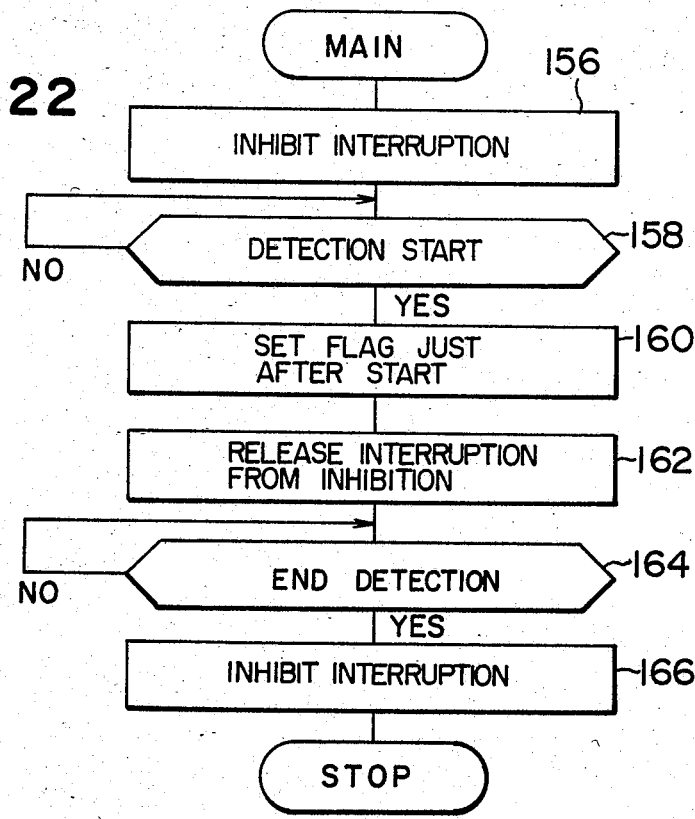
FIGS. 22 and 23 are flow charts useful for explaining the operation of the arrangement of FIG. 21.
Figure 23:
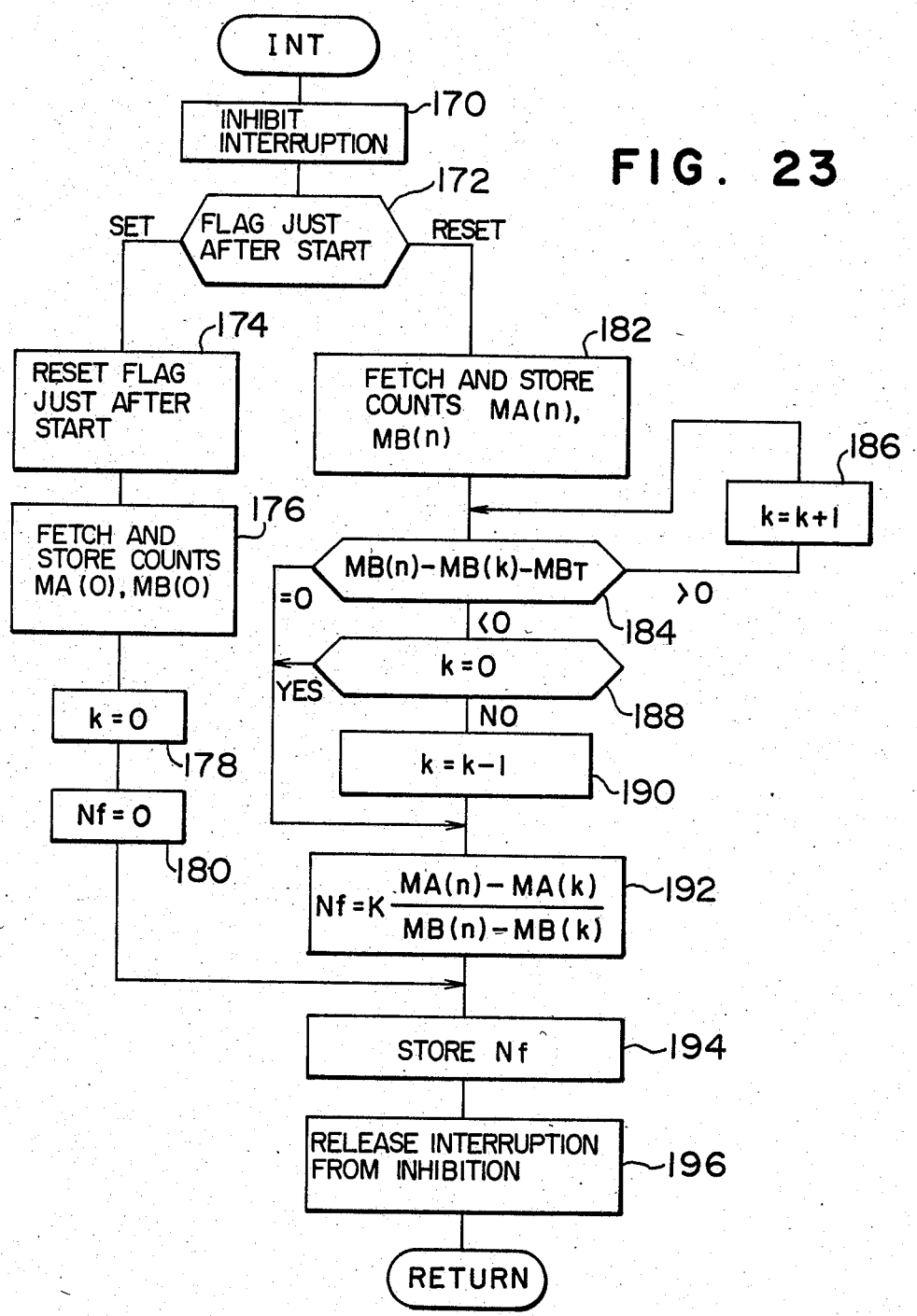
Figure 24:
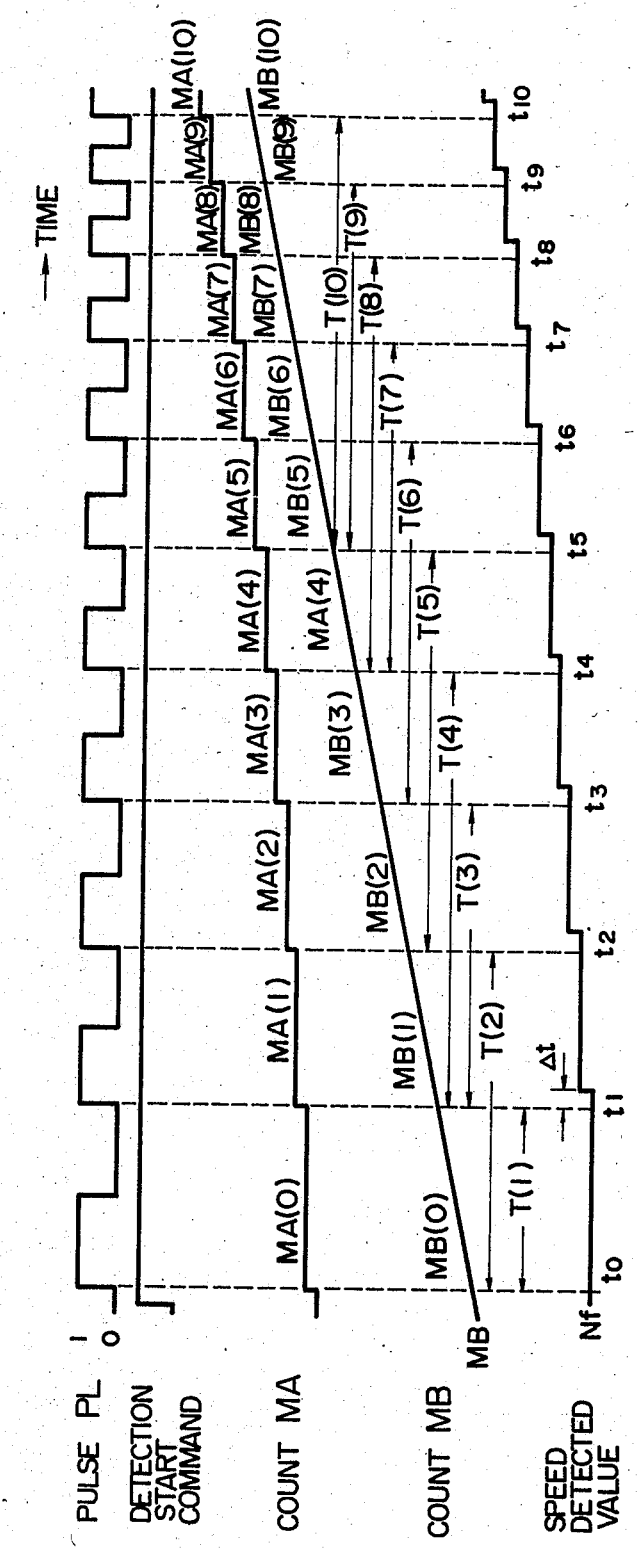
FIG. 24 is a timing chart useful for explaining the operation of the arrangement of FIG. 21.

The microprocessor 2 treats the MAIN process as shown in FIG. 22 and the INT process in FIG. 23. The MAIN process comprises steps 156 to 166 for chiefly deciding whether or not the detection is started, while the INT process is that steps 170 to 196 are executed in synchronism with the output pulse from the pulse generator 5 and after time $\Delta t$, the program returns to the MAIN process.

In the MAIN process, first, the MIN pulse is made "0" level in order to inhibit the interruption at step 156. Then, at step 158, a decision is made of the state of the detection start command. The detection start signal is stored at a certain address of a memory in the microprocessor 2. When the detection start command is to start detection level "1", the program goes to step 160. When the detection must not be started at "0" level, the process at step 158 is continuously performed until the detection start signal becomes "1" level. At step 160, the flag just after the start of detection is set. Then, at step 162, the interruption is released from the inhibition, or the NIN pulse PN is made "1" level, making the monostable circuit 15 operable. Thereafter, at step 164, a decision is continuously made of the end of detection until the detection end signal is generated. Under the execution of step 164, the output pulse PL from the pulse generator 5 is applied to the monostable circuit 15 and the INT pulse PI is applied to the microprocessor 2, which thus executes the INT process.

In the INT process, first, at step 170 the interruption is inhibited so that when the processing in the microprocessor 2 is slow, the next INT pulse PI when generated is prevented from being effective during the execution of INT process. Then, the state of the flag just after start is decided at step 172. When the INT process is synchronized with the pulse PL generated at time $t_o$ just after the start of detection, the program goes to step 174, where the flag just after start of detection is reset for the execution of the following steps 172 to 182. After the step 174 is executed, the program goes to step 176, where the microprocessor 2 receives the counts MA (0) and MB (0) of the counters 12 and 13, respectively and stores them in its memory. Here, MA (0) and MB (0) are counts at time $t_o$ and MA (n) and MB (n) are counts at time $t_n$ (see the counts MA and MB in FIG. 24).

At steps 178 and 180, K=Q and $N_f=0$ are established. At $t_o$, no speed detected value is obtained. After step 180 is finished, step 194 is executed to store the detected value $N_f$ in a predetermined memory. Of course, when the value is fed to an external apparatus, the value may be digital to the apparatus. At step 196, the interruption is released from the inhibition in order to treat the next INT process.

In the second INT process and the following operations from time $t_1$, steps 182 and 192 are executed. Now in the n-th process (INT process at time $t_n$), at step 182 the counts MA (n) and MB (n) of the counters 12 and 13 are supplied to the microprocessor 2, and stored in a certain memory thereof. Then, at step 184, a decision is made of whether the difference between the count MB (n) of the counter 13 at this time and the count MB (k) thereof at time $t_k$ before time $t_n$ exeeds a constant value $MB_T$ or not, where the constant value $MB_T$ is the number of clock pulses generated during the time Td. Therefore, at step 184 a decision is made of whether the time $(t_n-t_k)$ exceeds time Td or not. When time $(t_n-t_k)$ exceeds time Td, the program goes to step 186, where k is incremented by 1. Then, the program goes to step 184, again. Until the value of MB (n)−MB (k)−$MB_T$ becomes negative, the loop of steps 184 and 186 is repeatedly executed, and when it becomes negative, the program goes to step 188, where a decision is made of k=0. When k=0 (which corresponds to time $t_1$, $t_2$), there is only the first detected value, and thus the program goes to step 192 for calculating the speed from the counts MA (0) MB (0) at that time. When k≠0, the obtained k indicates the address at which data preceding by time Td or above from the present time $t_n$ and positioned at time $t_k$ nearest to time Td is stored. At step 184, if the value of MB (n)−MB (k)−$MB_T$=0, the time $t_k$ satisfies the relationship of $t_n-Td=t_k$ and thus immediately the step 192 is executed.

At step 192, the following equation of $$N_f = K_4 = \frac{MA(n) - MA(k)}{MB(n) - MB(k)} \quad (14)$$

is calculated by substituting thereinto the values MA (k), MB (k) stored at the addresses specified by k in each process and the values MA (n), MB (n) at this time.

The detected value $N_f$ is stored in a predetermined memory at step 194, and the interruption is released from the inhibition for the next INT process at step 196. Such operations are performed each time the pulse PL occurs, and the speed detected value $N_f$ is calculated. For example, in the timing chart of FIG. 24, the average speed in the interval T (1), that in the interval T (2), and that in the interval T (n) can be detected at time points $t_1$, $t_2$ and $t_n$, respectively. Of course, T (n) is near the set time Td.

As described above, in this embodiment, since the speed can be detected each time the pulse generator generates an output pulse, there is an effect of reducing the speed detection delay. Moreover, since the microprocessor 2 calculates the speed in synchronism with the output pulse PL from the pulse generator 5, the hardware arrangement is very simple. Furthermore, since the microprocessor 2 performs the interruption inhibiting process before starting to calculate the speed, the interruption during calculation is inhibited when the period with which the pulse PL is generated becomes shorter than the processing time $\Delta t$ in the microprocessor 2. Therefore, there is an effect of causing no error in the speed detected value.

Thus in accordance with this invention, the speed detection using the output pulse from the pulse generator can be performed with good resolution and precision even if the speed changes.

We claim:

1. A speed detecting apparatus comprising:
   a pulse generator means for generating a first pulse each time a vehicle moves by a predetermined distance;
   first counting means for counting the first pulses delivered from said pulse generator means;
   oscillator means for generating a clock pulse with a constant frequency higher than the frequency of generation of said first pulse;
   second counting means for counting the clock pulses delivered from said oscillator means;
   interruption pulse generating means for generating an interruption pulse in synchronism with the generation of said first pulse;
   timer means for generating a time interruption pulse each time a set time interval has lapsed; and
   microprocessor means responsive to receipt of said interruption pulse and said time interruption pulse for calculating the speed of said vehicle on the basis of a count value of said first counting means during a time interval from when a pulse is generated by said pulse generator at or adjacent the measuring start point of said set time interval to when a pulse is generated by said pulse generator just before or after the end point of said set time interval and a count value of said second counting means during said time interval, said microprocessor means operating to control said interruption pulse generating means so as to selectively inhibit the generation of said interruption pulse.

2. A speed detecting apparatus according to claim 1, wherein said timer starts counting said set time interval in response to a pulse generated by said pulse generator means.

3. A speed detecting apparatus according to claim 1, wherein said microprocessor allows the generation of said interruption pulse only during a time interval from the reception of said time interruption pulse to when said interruption pulse generating means generates an interruption pulse.

4. A speed detecting apparatus according to claim 1, further comprises reset pulse generating means for generating a reset pulse each time a first pulse is generated from said pulse generator means to thereby reset said second counting means, wherein said microcomputer determines the speed of said vehicle on the basis of a count value of said first counting means and a value obtained by subtracting a count value of said second counting means at a time point where the time interruption pulse is generated from a count value of said second counting means at the end point of said set time interval.

5. A speed detecting apparatus according to claim 1, wherein said timer makes said set time interval larger when a change of speed of said vehicle is less than a set value.

6. A speed detecting apparatus comprising:
   pulse generator means for generating a first pulse each time a vehicle moves by a predetermined distance;
   first counting means for counting the first pulses delivered from said pulse generator means;
   oscillator means for generating a clock pulse with a constant frequency higher than the frequency of generation of said first pulse;
   second counting means for counting the clock pulses delivered from said oscillator means;
   interruption pulse generating means for generating an interruption pulse in synchronism with the generation of said first pulse;
   timer means for generating a time interruption pulse each time set time interval has lapsed; and
   microprocessor means responsive to receipt of said interruption pulse and said time interruption pulse for
   (a) initiating the start of said timer means,
   (b) inhibiting operation of said interruption pulse generating means during the period after said timer means has been started and prior to generation of said time interruption pulse,
   (c) reading the contents of said first and second counting means following the receipt of said time interruption pulse, and
   (d) calculating the speed of said vehicle on the basis of the read contents of said first and second counting means.

7. A speed detecting apparatus according to claim 6, wherein said microprocessor means initiates the start of said timer means in response to receipt of an interruption pulse.

8. A speed detecting apparatus according to claim 6, further including means for resetting said second counting means in response to each generation of a first pulse.

9. A speed detecting apparatus according to claim 8, wherein said first and second counting means are read immediately following the receipt of said time interruption pulse.

10. A speed detecting apparatus according to claim 6, wherein said microprocessor means is responsive to receipt of said time interruption pulse for removing the inhibition of operation of said interrupt pulse generating means and operates to read the contents of said first and second counting means in response to receipt of an interruption pulse after receipt of said time interruption pulse.

* * * * *